United States Patent [19]
Desormiere et al.

[11] Patent Number: 6,017,582
[45] Date of Patent: *Jan. 25, 2000

[54] METHOD OF MAKING A PROFILED ELEMENT HAVING A SURFACE LAYER FOR REDUCING THE COEFFICIENT OF FRICTION BETWEEN THE PROFILED ELEMENT AND A GLAZING SURFACE

[75] Inventors: Sophie Desormiere, Gonesse; Michel Oulie, Issoire, both of France

[73] Assignee: Valeo Systemes D'Essuyage, La Verriere, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,768

[22] Filed: Jun. 13, 1997

[30] Foreign Application Priority Data

Jun. 13, 1996 [FR] France ..................................... 9607333

[51] Int. Cl.⁷ ................................. B05D 1/02; B05D 1/18
[52] U.S. Cl. .......................... 427/180; 427/353; 427/368; 427/421; 427/430.1
[58] Field of Search ..................................... 427/180, 353, 427/359, 368, 421, 430.1, 475; 139/15, 250.361; 523/204

[56] References Cited

U.S. PATENT DOCUMENTS 4,331,712  5/1982  Cohen et al. ........................... 427/202

FOREIGN PATENT DOCUMENTS 562 191  9/1993  European Pat. Off. .
56-152975  11/1981  Japan .
58-42624  3/1983  Japan .

OTHER PUBLICATIONS

Hawley's Condensed Chemical Dictionary, 13$t_{th}$ Ed, p. 1175, 1997.
Patent Abstracts of Japan, vol. 007, No. 122 (C–168), May 26, 1983 & JP 58 042624 A (Toyoda Gosei KK), Mar. 12, 1983.
Database WPI, Section CH, Week 8240, Derwent Publications Ltd., London, GB; AN 82–84795E XP002026955 & JP 57 140 159 A (Toyoda Gosei KK), Aug. 1982.
Database WPI, Section CH, Week 8501, Derwent Publications Ltd., London, GB; Class A32, AN 85–002674 XP002026956 & JP 59 201 838 A (Toyoda Gosei KK), Nov. 15, 1984.
Database WPI, Section CH, Week 7913, Derwent Publications Ltd., London, GB; AN 79–24560B XP002026957 & JP 54 022 482 A (Nippon Oil Seal Ind) Feb. 20, 1979.
French Search Report dated Mar. 21, 1997.

*Primary Examiner*—Fred J. Parker
*Attorney, Agent, or Firm*—Morgan & Finnegan LLP

[57] ABSTRACT

A wiping strip for a motor vehicle screen wiper is in the form of a profiled element of vulcanised material consisting of rubber or an elastomeric material, having a surface layer for reducing the coefficient of friction between the wiping strip and a glass surface to be wiped. The surface layer is formed by immersion of the profiled element in a solution, or by exposing the profiled element to the solution in atomised form. The solution consists of a solvent with a powder, such as graphite, dispersed in it. The step of forming the surface layer is carried out during the step of vulcanising the material of the profiled element.

16 Claims, No Drawings

METHOD OF MAKING A PROFILED ELEMENT HAVING A SURFACE LAYER FOR REDUCING THE COEFFICIENT OF FRICTION BETWEEN THE PROFILED ELEMENT AND A GLAZING SURFACE

FIELD OF THE INVENTION

This invention relates to a method of making a profiled element from rubber or an elastomeric material, natural or synthetic, the material being vulcanized and having a surface layer which is adapted to reduce the coefficient of friction between the profiled element and a surface of a glazing element (for example a vehicle windshield) over which the profiled element is to be passed in wiping motion. A non-limiting example of such a profiled element is a wiping strip for a motor vehicle screen wiper.

The invention also relates to such a wiping strip, when made by such a method.

BACKGROUND OF THE INVENTION

In a known technique, a profiled element of the general kind defined above, for example a motor vehicle windshield wiper wiping strip, is clad with a lubricating coating, which is obtained by immersing the wiping strip in a solution in which a powder, such as graphite for example, is immersed, or by applying this solution in atomised form to the profiled element.

In this known technique, the lubricant coating is formed by immersing the wiping strip in a solution which consists essentially of an acrylic resin binder in which the graphite powder is dispersed, or by applying the same solution in atomised form on the profiled element. After application of this solution, the wiping strip is dried so as to produce a surface layer which gives the wiping strip properties which considerably improves the quality of the wiping action performed by the windshield wiper in which the strip is later incorporated. Although such a coating does improve wiping quality, it has the disadvantage that it is particularly fragile, and in particular it has a very low resistance to detergents and other cleaning agents which are typically employed in the washing of vehicles. As a result, the lubricant coating has a very short useful life, in that it rapidly deteriorates and even disappears completely, thus quickly reducing wiping performance.

OBJECT OF THE INVENTION

The object of the invention is to provide a novel method for forming the surface layer of a profiled element such as a wiping strip, as defined above, which overcomes the above mentioned drawback by producing a low-friction surface layer of improved durability.

STATEMENT OF THE INVENTION

According to the invention, a method of making a profiled element of rubber or an elastomeric material, the profiled element being vulcanized and including a surface layer for reducing the coefficient of friction between the profiled element and a surface of a glazing element, in which the surface layer is formed by immersion of the profiled element in a solution in which a powder, in particular crystalline graphite, is dispersed, or by application of the said solution in atomised form on to the profiled element, is characterised in that the step of forming the surface layer is carried out during the vulcanization of the profiled element.

DISCUSSION OF THE INVENTION, AND DESCRIPTION OF PREFERRED EMBODIMENTS THEREOF

In the method of the invention, the solution which is employed typically consists essentially of a solvent in which the powder is dispersed. The powder is preferably a crystalline graphite powder, the particle size of which preferably lies in the range between 1 and 10 microns.

In general terms, in the method having features of the present invention, the solvent in which the profiled element is immersed, or which is applied in atomised form to the profiled element, causes the material, consisting of rubber or an elastomer, to undergo, during reticulation of the material in the vulcanising step of the process, a swelling effect in the manner of a sponge. What happens here is that the cavities in the material become dilated during this process, and are filled with the particles that constitute the lubricant powder.

The profiled element may, by way of non-limiting example, be a wiping strip for a motor vehicle screen wiper.

After the evaporation of the solvent, and at the end of the vulcanization process, or during an intermediate drying step which may if desired be interposed between the immersion of the profiled element in the treatment solution (or the application of this solution in atomised form to the profiled element), the solvent evaporates; and the powder particles are trapped in the surface pores, thus constituting a durable surface layer which is doped with powder to a depth of about 6 to 12 microns.

The immersion step may be carried out by plunging the profiled element into a bath of the solution in liquid form, or by applying a mist of the solution, i.e. an atmosphere saturated with droplets of the solution, to the profiled element.

The application of the solution is preferably carried out while the amount of reticulation in the rubber or elastomer material is less than about 80%. Preferably, a phase of the vulcanization step is selected, in the course of which the amount of reticulation in the rubber or elastomeric material is increasing continuously but is in the range defined between 10% and 80%.

The solvent itself may be of any one of various compositions. It may be selected from, for example, alkanes, alkenes, or aromatic, aliphatic and similar compounds.

The immersion of the profiled element in the solution, or the application of the solution in atomised form to the profiled element, may be carried out in a single step, or in the form of two or more successive applications, in solutions based on solvents which are identical to each other or different from each other, and in which the lubricant powders may be of different compositions and/or may have the same particle size or different particle sizes.

The powder preferably consists of a graphite powder, but it could be replaced or augmented by a powder of another low friction compound, such as polytetrafluorethylene, molybdenum disulphide, and so on.

The method of the invention produces a surface layer which is very strong and highly resistant to wear, and which is also hydrophobic.

The application of graphite to profiled elements, particularly motor vehicle screen wiper wiping strips, carried out by the method of doping the surface layer in accordance with the invention, has the further particular advantage that it is carried out before two wiping strips are separated from each other by cutting, when the latter are extruded simultaneously and joined together through their respective wiping edges. The narrow wiping edge of each strip, having been formed by this cutting step, does not itself therefore have a surface layer doped with a lubricant agent. This facilitates turning of the wiping strip at the end of each stroke of the alternate wiping operation by the wiper.

In accordance with a further feature of the invention, the method of the invention may further include a final step which is carried out after the rubber or elastomeric material has been fully vulcanized, this final step consisting of brushing the surface element that includes the surface layer. The brushing step is for example carried out by passing the profiled element longitudinally between two adjacent rotating brushes. These brushes are rotated in opposite senses or directions of rotation. The direction of rotation of each brush is preferably such that the brush, where it makes contact with the profiled element, does so in a linear direction opposed to the linear direction in which the profiled element is advanced between the brushes.

The complementary brushing step homogenizes the surface coating of the profiled element, and prevents the coating having defects in its outward appearance, or other defects such as irregularities within its thickness, or indeed adhesion faults. In this connection, it is desirable to eliminate all of these defects, because where they exist they give rise to the risk of causing stripes to be produced during the wiping operation (where the profiled element is a screen wiper wiping strip); such force can also lead to local deposits of graphite on the glass being swept, and to other undesirable effects.

Thus, the brushing step removes any excess graphite, eliminates graphite particles which are adhering poorly to the profiled element, and homogenizes the graphite particles, by orienting the graphite platelets in the same direction. The brushing operation also enables the presence of the coating to be seen, because brushing alters the appearance of the coating by changing its colour from matt black to a metallic grey shade.

The brushes may be replaced by brushing rollers made for example of felt or a suitable porous material. These rollers, if used, have profiles which are complementary to that of the profiled element being treated.

In another version of the method according to the invention, the brushing step may be replaced by an equivalent operation in which high pressure water jets are sprayed on the coated profiled element.

What is claimed is:

1. A method of making a profiled element made of a material selected from the group consisting of rubber and elastomeric materials, the method comprising:

vulcanizing the material, wherein the vulcanizing includes reticulation of the material, and forming a surface layer on the material during the vulcanizing, the forming comprising:

swelling the material to create a plurality of surface pores by applying a first solution containing a first powder of anti-friction material dispersed in a first solvent trapping the first powder in the surface pores.

2. A method according to claim 1, wherein forming the surface layer is performed before an amount of reticulation of the material reaches 80%.

3. A method according to claim 1, wherein forming the surface layer is performed while an amount of reticulation of the material is increasing and is in the range between 10% and 80%.

4. A method according to claim 1, wherein forming the surface layer comprises immersing the material in the first solution.

5. A method according to claim 1; wherein forming the surface layer is performed by applying the first solution in atomized form to the material.

6. A method according to claim 1, wherein the first powder comprises particles having a particle size between 1 and 10 microns.

7. A method according to claim 1, further including drying the material having the solution applied thereon prior to the drying, thereby evaporating the first solvent, before the end of the vulcanizing.

8. A method according to claim 1, further including brushing the profiled element after the vulcanizing.

9. A method according to claim 8, wherein brushing comprises passing the profiled element longitudinally between two adjacent brushes rotating in opposite directions of rotation.

10. A method according to claim 9, wherein during the brushing, the profiled element is passed between the brushes in a first direction, the brushes being rotated in directions of rotation such as to make contact with the profiled element in a second direction opposite to the first direction.

11. A method according to claim 8, wherein the brushing is carried out by passing the profiled element between two rollers having profiles complementary to that of the profiled element.

12. A method according to claim 1, further including projecting water jets on to the profiled element after the vulcanizing.

13. A method according to claim 1, further including forming an additional surface layer on the material during reticulation including applying to the material a second solution, the second solution comprising a second powder of anti-friction material dispersed in a second solvent.

14. A method according to claim 13, wherein the first solution and the second solution are different.

15. A method according to claim 14, wherein the first powder and the second powder are different.

16. A method according to claim 14, wherein the first solvent and the second solvent are different.

* * * * *

UNITED STATES PATENT AND TRADEMARK OFFICE
CERTIFICATE OF CORRECTION

PATENT NO.   : 6,017,582
DATED        : January 25, 2000
INVENTOR(S)  : Sophie Desormiere, et al.

It is certified that error appears in the above-identified patent and that said Letters Patent is hereby corrected as shown below:

In claim 1, col. 4, line 3, please insert ", and" after "solvent".

Signed and Sealed this

Tenth Day of October, 2000

*Attest:*

Q. TODD DICKINSON

*Attesting Officer*  Director of Patents and Trademarks